(12) United States Patent
Dolan (10) Patent No.: US 10,030,688 B2
(45) Date of Patent: *Jul. 24, 2018

(54) APPARATUS FOR TIGHTENING THREADED FASTENERS

(75) Inventor: Michael F. Dolan, Kenilworth, NJ (US)

(73) Assignee: HYTORC Division UNEX Corporation, Mahwah, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/814,229

(22) PCT Filed: Feb. 2, 2012

(86) PCT No.: PCT/US2012/023693
§ 371 (c)(1),
(2), (4) Date: Mar. 27, 2013

(87) PCT Pub. No.: WO2013/019278
PCT Pub. Date: Feb. 7, 2013

(65) Prior Publication Data
US 2013/0180369 A1    Jul. 18, 2013

Related U.S. Application Data

(63) Continuation of application No. PCT/IB2011/002658, filed on Aug. 2, 2011.
(Continued)

(51) Int. Cl.
*F16B 39/36* (2006.01)
*F16B 37/00* (2006.01)
(Continued)

(52) U.S. Cl.
CPC ............ *F16B 37/00* (2013.01); *B25B 15/008* (2013.01); *B25B 23/0085* (2013.01);
(Continued)

(58) Field of Classification Search
CPC ...................................................... F16B 37/00
(Continued)

(56) References Cited

U.S. PATENT DOCUMENTS

| 1,389,468 A | * | 8/1921 | White | B25B 21/001 81/124.1 |
| 1,969,223 A | * | 8/1934 | Kotvis | F16B 39/36 411/278 |

(Continued)

FOREIGN PATENT DOCUMENTS

DE    9411853 U1    9/1994

*Primary Examiner* — Gary W Estremsky
(74) *Attorney, Agent, or Firm* — Justin B. Bender, Esq.

(57) ABSTRACT

According to a first aspect of the invention we provide an apparatus (1) for use with a threaded fastener including: —an inner sleeve member (100) having an internal surface threadedly engagable with the fastener and a tapered external surface; and an outer sleeve member (200) having an inversely tapered internal surface rotatably engagable with the tapered external surface of the inner sleeve member. Advantageously, the invention allows for an increased load bearing surface area between the inner sleeve member (100), which is clamped, and the outer sleeve members (200) without increasing the overall diameter of the apparatus (1) 6; a three dimensional load bearing surface area rather than a conventional two dimensional plane; more efficiently and evenly distributed load stress distribution over the load bearing surface area; higher torsion strength; and apparatus with lower mass, dimensions and volume.

15 Claims, 5 Drawing Sheets

Related U.S. Application Data (60) Provisional application No. 61/370,015, filed on Aug. 2, 2010.

(51) Int. Cl.
  *B25B 23/00* (2006.01)
  *F16B 31/02* (2006.01)
  *B25B 15/00* (2006.01)

(52) U.S. Cl.
  CPC ............ *F16B 31/02* (2013.01); *F16B 31/027* (2013.01); *F16B 39/36* (2013.01)

(58) Field of Classification Search
  USPC ........... 411/427, 433, 531, 546, 371.2, 935.1
  See application file for complete search history.

(56) References Cited

U.S. PATENT DOCUMENTS

| | | | | |
|---|---|---|---|---|
| 2,908,309 | A * | 10/1959 | Brill | 411/301 |
| 4,258,596 | A * | 3/1981 | Bisbing | F16B 23/0046 411/403 |
| 5,112,176 | A * | 5/1992 | McCauley | F16B 41/005 411/432 |
| 5,137,408 | A * | 8/1992 | Junkers | F16B 31/04 411/222 |
| 5,437,526 | A * | 8/1995 | Herbst | E04C 5/07 405/259.5 |
| 5,622,465 | A | 4/1997 | Junkers | |
| 6,220,801 | B1 | 4/2001 | Lin | |
| 6,273,659 | B1 * | 8/2001 | Goto | B24B 45/006 411/354 |
| 6,357,981 | B1 * | 3/2002 | Lanham | F16B 23/0061 411/374 |
| 6,435,791 | B1 * | 8/2002 | Bydalek | B60B 3/145 411/371.2 |
| 6,461,093 | B1 * | 10/2002 | Junkers | F16B 31/04 411/432 |
| 6,685,412 | B2 * | 2/2004 | Altarac | F16B 23/003 411/403 |
| 6,792,838 | B2 | 9/2004 | Brooks | |
| 6,988,432 | B2 | 1/2006 | Brooks | |
| 7,003,862 | B2 | 2/2006 | Junkers | |
| 7,125,213 | B2 | 10/2006 | Junkers | |
| 7,188,554 | B2 * | 3/2007 | Baynham | 411/402 |
| 2005/0053443 | A1 * | 3/2005 | McKay | F16B 39/12 411/222 |
| 2007/0108402 | A1 * | 5/2007 | Davis | F16K 31/041 251/293 |
| 2007/0199718 | A1 * | 8/2007 | Boyd | E21B 17/05 166/379 |
| 2010/0294856 | A1 * | 11/2010 | Griesenbruch | B05B 7/066 239/290 |
| 2011/0108275 | A1 * | 5/2011 | Borak | E21B 33/037 166/308.1 |

* cited by examiner

APPARATUS FOR TIGHTENING THREADED FASTENERS

CROSS REFERENCE TO RELATED APPLICATIONS

This Application is a continuation application of U.S. Application Ser. No. 61/370,015, having Filing Date of Aug. 2, 2010, entitled "Conical Geometry for Torsion Coupling During Bolting", and is a continuation application of PCT International Application Serial No. PCT/IB2011/002658, having Filing Date of Aug. 2, 2011, entitled "Apparatus For Tightening Threaded Fasteners", entire copies of which are incorporated herein by reference.

Innovations disclosed in this Application advance technology disclosed in the following commonly owned issued patents and patent applications, entire copies of which are incorporated herein by reference: U.S. Pat. No. 5,137,408, having Filing Date of Dec. 3, 1991, entitled "Fastening Device"; U.S. Pat. No. 5,318,397, having Filing Date of May 7, 1992, entitled "Mechanical Tensioner"; U.S. Pat. No. 5,622,465, having Filing Date of Apr. 26, 1996, entitled "Lock Nut"; U.S. Pat. No. 5,640,749, having Filing Date of Jun. 13, 1995, entitled "Method Of And Device For Elongating And Relaxing A Stud"; U.S. Pat. No. 5,888,041, having Filing Date of Oct. 17, 1997, entitled "Lock Nut"; U.S. Pat. No. 6,254,322, having Filing Date of Mar. 3, 1998, entitled "Bolt With A Bolt Member, A Washer And A Sleeve For Applying Forces To The Bolt Member And The Sleeve"; et al.

DESCRIPTION OF INVENTION

Conventional threaded fasteners are known. Mechanical fastening with helically threaded components is typically achieved with bolts, studs, screws, nuts and washers. Washers are thin members that can be placed between the fastener and the fastened component. Washers are typically used to prevent frictional damage to assembled components. Washers are also commonly used to distribute stresses evenly and to control friction losses. Nuts are internally threaded fastening members commonly used to retain and or deliver load to an externally threaded fastener. Nuts typically have an external geometry that will allow rotational coupling with a torque input device or machine.

Self-reacting nuts are typically comprised of an inner sleeve, outer sleeve and washer. Self-reacting fasteners such as the HYTORC Nut use the washer as a reaction point for the application of input torque to the outer sleeve. In a self-reacting fastener the outer sleeve functions as the nut while the inner sleeve becomes an extension of the stud and is rotationally coupled with the washer. This rotational coupling prevents sliding motion between the inner sleeve and stud threads during the application of torque to the outer sleeve. Self-reacting nuts with the same external geometry as conventional nuts suffer from higher bearing surface stresses. The bearing surface stresses are higher because the outer sleeve inside diameter is increased to allow space for the inner sleeve causing a thinner wall thickness than standard nuts.

In contrast to conventional threaded fasteners, self-reacting three-piece mechanical tensioner fasteners such as the HYTORC NUT, include an outer sleeve, inner sleeve and washer. Self-reacting fasteners such as the HYTORC Nut use the washer as a reaction point for the application of input torque to the outer sleeve. In a self-reacting fastener the outer sleeve functions as the nut while the inner sleeve becomes an extension of the stud and is rotationally coupled with the washer. This rotational coupling prevents sliding motion between the inner sleeve and stud threads during the application of torque to the outer sleeve. Self-reacting nuts with the same external geometry as conventional nuts suffer from higher bearing surface stresses. The bearing surface stresses are higher because the outer sleeve inside diameter is increased to allow space for the inner sleeve causing a thinner wall thickness than standard nuts.

Additionally devices of coupling or mating a reaction or an output shaft of a torque output device to fasteners used in bolting also are known. Self-reacting three-piece mechanical tensioner fasteners typically have spline, hex or square features to allow torsion coupling with the reaction member of the torque input device. This is achieved with machined rotational interferences between two parts. The interference is typically created with a male and female engagement between any two mating features that prevent rotation between the two parts.

Three-piece mechanical tensioning stud devices are also known. They consist of a stud, nut and washer. The stud has external threads on both ends. Under the upper thread the stud will also have a spline or other geometry to create a rotational coupling with the inner diameter of the washer. The topside of the stud will also have a spline or other geometry to allow rotational coupling with the reaction shaft of the torque input device. The nut is internally threaded to mate with the threads on the topside of stud. The nut will have a spline or other geometry to allow the introduction of torque from torque input device. The washer has an internal geometry that will mate rotationally with the spline or other geometry under the top thread of the stud.

In bolting applications stresses are typically near the elastic limits of the materials. The reaction feature that couples the three-piece mechanical tensioning stud to the torque of the torque input device typically has to be oversized to prevent elastic material failures. Therefore it is not possible with known coupling features to carry the high magnitude of torque with an internal feature such as a square, hexagon or internal spline hole in the top surface of the stud. Consequently prior art applications that are subject to high bolting stress must have an external feature on the topside of the stud that will allow the coupling of a sufficiently sized reaction shaft from the torque input device.

The present invention has therefore been devised to address these issues.

According to a first aspect of the invention we provide an apparatus for use with a threaded fastener including:—
  an inner sleeve member having an internal surface threadedly engagable with the fastener and a tapered external surface; and
  an outer sleeve member having an inversely tapered internal surface rotatably engagable with the tapered external surface of the inner sleeve member.

Advantageously, the invention allows for an increased load bearing surface area between the inner sleeve member, which is clamped, and the outer sleeve members without increasing the overall diameter of the apparatus; a three dimensional load bearing surface area rather than a conventional two dimensional plane; more efficiently and evenly distributed load stress distribution over the load bearing surface area; higher torsion strength; and apparatus with lower mass, dimensions and volume.

Further features of the invention are set out in claims 2-15 appended hereto.

The invention may be described by way of example only with reference to the accompanying drawings, of which.

Referring to FIGS. 1-4 by way of example, this shows an apparatus 1—a stepped conical fastener assembly—in accordance with an embodiment of the present invention. Apparatus 1 has an inner sleeve member 100 and an outer sleeve member 200 and is used with, by way of example, a threaded stud 300. Inner sleeve member 100 is rotatably and threadedly engagable with stud 300; rotatably and taperedly engagable with outer sleeve member 200; and non-rotatably engagable with an action portion of a torque input device. Outer sleeve member 200 is non-rotatably engagable with a reaction portion of the torque input device; and rotatably and taperedly engagable with inner sleeve member 100. Inner sleeve member 100, when rotated by the action portion of the torque input device, applies a load to stud 300 to close a joint (not shown).

Figure 1:
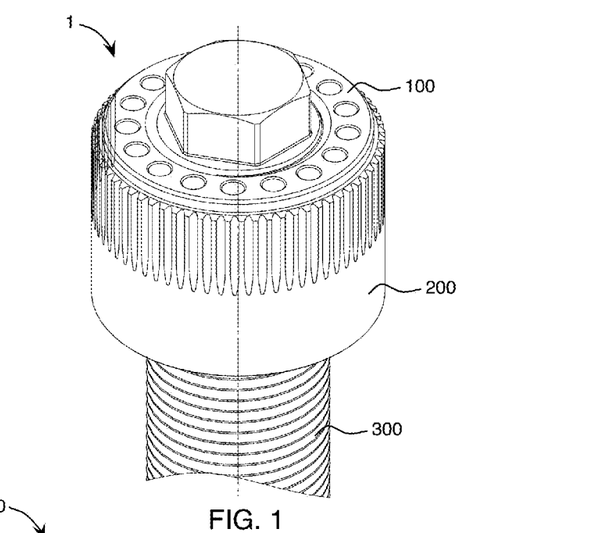
FIG. 1 is a perspective view of a threaded fastener with an embodiment of the present invention.
Figures 2, 3, 4:
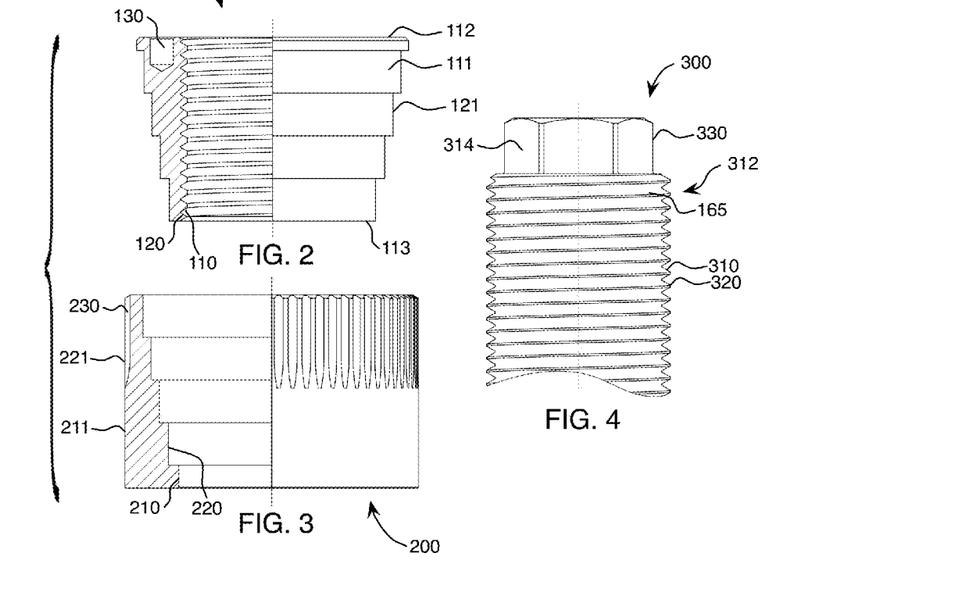
FIG. 2 is a side, cross-sectional view of an inner sleeve of an embodiment of the present invention.
FIG. 3 is a side, cross-sectional view of an outer sleeve of an embodiment of the present invention.
FIG. 4 is a side view of a threaded fastener for use with an embodiment of the present invention.

Inner sleeve member 100 is an annular body and, as shown in FIGS. 1 and 2, formed as a sleeve. It has an inner surface 110 with an inner helical thread means 120 engagable with an outer surface 310 with an outer helical thread means 320 of stud 300. It has an outer surface 111 with a cylindrical formation 121 which is rotatably engagable with an inner surface 210 with a cylindrical formation 220 of outer sleeve member 200. It further has a lower surface 113 which is rotatably engagable with inner surface 210.

Cylindrical formation 121 is shaped as an inverted frustum of a stepped cone which has a tapered or conical appearance from the bottom up. Each step on outer surface 111 is progressively smaller from top to bottom. An external hollow cylindrical feature is removed from the outside of inner sleeve member 100 at a shallow depth. Successive external hollow cylindrical features are removed at regular length and width intervals. Each successive feature starts where the preceding feature stops. The geometric pattern of removed external cylindrical features continues until space restricts the addition of another internal cylindrical feature.

Inner sleeve member 100 further has an upper surface 112 with a coupling means 130 which may be formed by a plurality of bores extending in an axial direction and spaced from one another in a circumferential direction. Coupling means 130 non-rotatably engages with the action portion of the torque input device.

Outer sleeve member 200 is an annular body and, as shown in FIG. 3, formed as a sleeve. It has inner surface 210 with cylindrical formation 220 which is rotatably engagable with an outer surface 111 with cylindrical formation 121 of inner sleeve member 100. Outer sleeve member 200 has an outer surface 211 with a coupling means 230. Coupling means 230 is formed by a plurality of outer spines extending in an axial direction and spaced from one another in a circumferential direction. Coupling means 230 non-rotatably engages with inner spines of a reaction portion of the torque input device.

Cylindrical formation 220 is shaped as a frustum of a stepped cone which has a tapered or conical appearance from the top down. Each step on inner surface 210 is progressively smaller from top to bottom. An internal cylindrical feature is removed from the inside of outer sleeve member 200 at a shallow depth. Successive internal cylindrical features are removed at regular length and width intervals. Each successive feature starts where the preceding feature stops. The geometric pattern of removed internal cylindrical features continues until space restricts the addition of another internal cylindrical feature.

Stud 300 has a cylindrical shape with outer helical thread means 320 for mating with inner helical thread means 120 of inner sleeve 100. An end 312 of stud 300 has a coupling means 314 which may be formed by a polygonal formation 330, which in this case is a hexagon shape. Polygonal formation 330 allows for rotational coupling with the torque input device.

Second coupling member 150 further has a lower surface 163 which rests on an upper surface of the joint. Lower surface 163 may be substantially rough and may be made in many different ways, for example by a plurality of ridges, ripples or teeth.

The stepped conical fastener geometry of apparatus 1 creates tensile load in stud 300 by the mechanical sliding action through the helical inclined plane between stud threads 320 and inner sleeve member threads 120. The sliding helical thread action is created by using the torque input device to apply rotation under torque to inner sleeve member coupling means 130 while reacting the torque on outer sleeve member external splines 230. As outer surface 111 and inner surface 210 are substantially smooth, outer sleeve member 200 remains static while inner sleeve member 200 rotates. The reaction element of the torque input device is rotationally coupled with end 312 of stud 300 by coupling means 314. This prevents rotation of stud 300 and allows the relative sliding action between inner sleeve member threads 120 and studs threads 320. Stud translation occurs in proportion to the resistance against such translation as the torque input device continually applies torque to inner sleeve member 100 while reacting on outer sleeve member external splines 230 and being rotationally coupled with stud 300 by coupling means 314.

Figure 5:
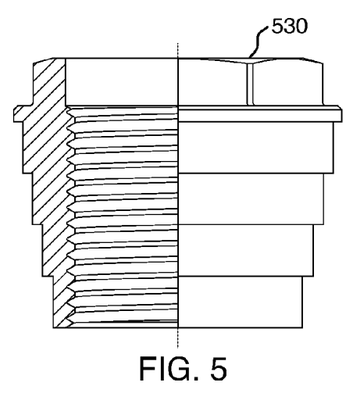
FIG. 5 is a side, cross-sectional view of an embodiment of the present invention.

Inner sleeve member coupling means 130 may be formed by any suitable geometry or used with other means or features for rotationally coupling with the torque input device such as gear teeth, hex, double hex, castellation or any other common geometry that allows rotational coupling. One possible alternative is hex geometry shown in FIG. 5 as 530.

Figure 6:
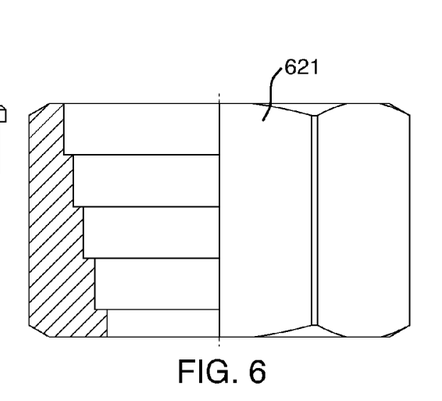
FIG. 6 is a side, cross-sectional view of an embodiment of the present invention.

Outer sleeve member coupling means 221 may be formed by any suitable geometry or used with other means or features for rotationally coupling with the torque input device such as gear teeth, hex, double hex, castellation or any other common geometry that allows rotational coupling. One possible alternative is hex geometry shown in FIG. 6 as 621.

Note that the quantity, dimensions, geometries and intervals of removed external (inner sleeve member 100) and internal (outer sleeve member 200) cylindrical features may vary to optimize characteristics of apparatus 1, such as, for example, stress biasing, depending on the application.

Figures 7, 8:
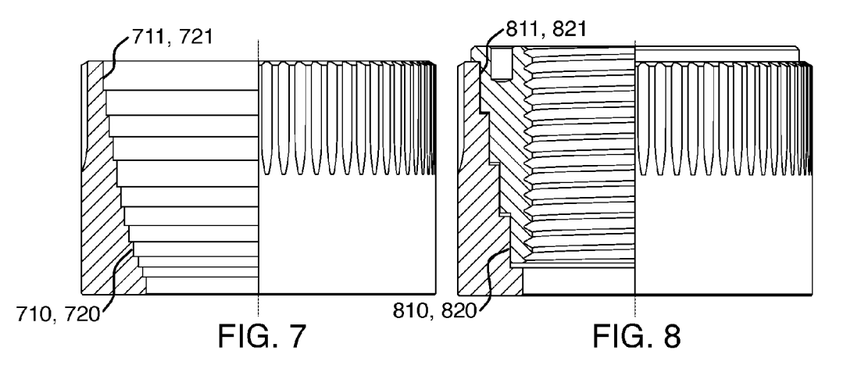
FIG. 7 is a side, cross-sectional view of an embodiment of the present invention.
FIG. 8 is a side, cross-sectional view of an embodiment of the present invention.

FIG. 2 shows inner sleeve member 100 with four external cylindrical features removed at regular length and width intervals. FIG. 3 shows outer sleeve member 200 with four internal cylindrical features removed at regular length and width intervals. As shown in FIG. 7, varying the quantity, dimensions, geometries and intervals from one removed external and internal cylindrical feature to the next varies the nominal angles, step heights and step widths of an outer surface 711 with a cylindrical formation 721 and an inner surface 710 with a cylindrical formation 720. Alternatively, the step length may be sized infinitely small to create a nearly smooth taper. External portions of inner sleeve member 100 and internal portion of outer sleeve member 200 may be removed in one step to form smooth conical surfaces, respectively.

FIG. 8 shows an outer surface 811 with a cylindrical formation 821 and an inner surface 810 with a cylindrical formation 820 with mating faces of varying vertical spacing, or step heights. This allows movement on selective steps only as other steps are loaded. Plastic deformation allows vertical movement therefore strategically biasing stress distribution across each stepped face. In other words, increased clearance or spacing between mating faces of inner and outer sleeve members 100 and 200 allow for radial expansion during loading.

Figure 9:
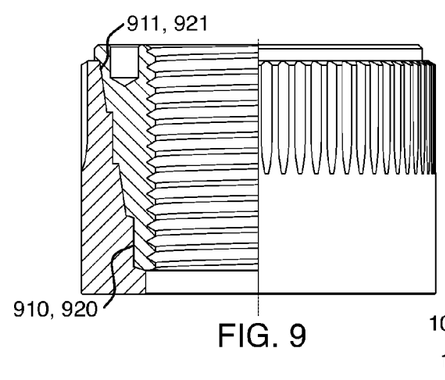
FIG. 9 is a side, cross-sectional view of an embodiment of the present invention.

FIG. 9 shows an outer surface 911 with a cylindrical formation 921 and an inner surface 910 with a cylindrical formation 920 with mating faces of varying step face angles. This promotes more evenly and controlled biasing stress distribution across the steps. In other words, either or both inner and outer sleeve members 100 and 200 may have stepped vertical surfaces with varying pitch angles to bias stress to selective horizontal stepped surfaces.

Figure 10:
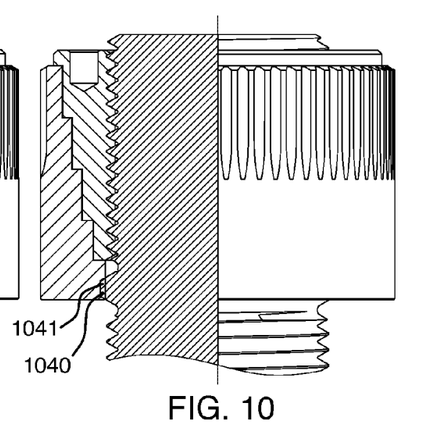
FIG. 10 is a side, cross-sectional view of an embodiment of the present invention.
Figures 11, 12, 13, 14:
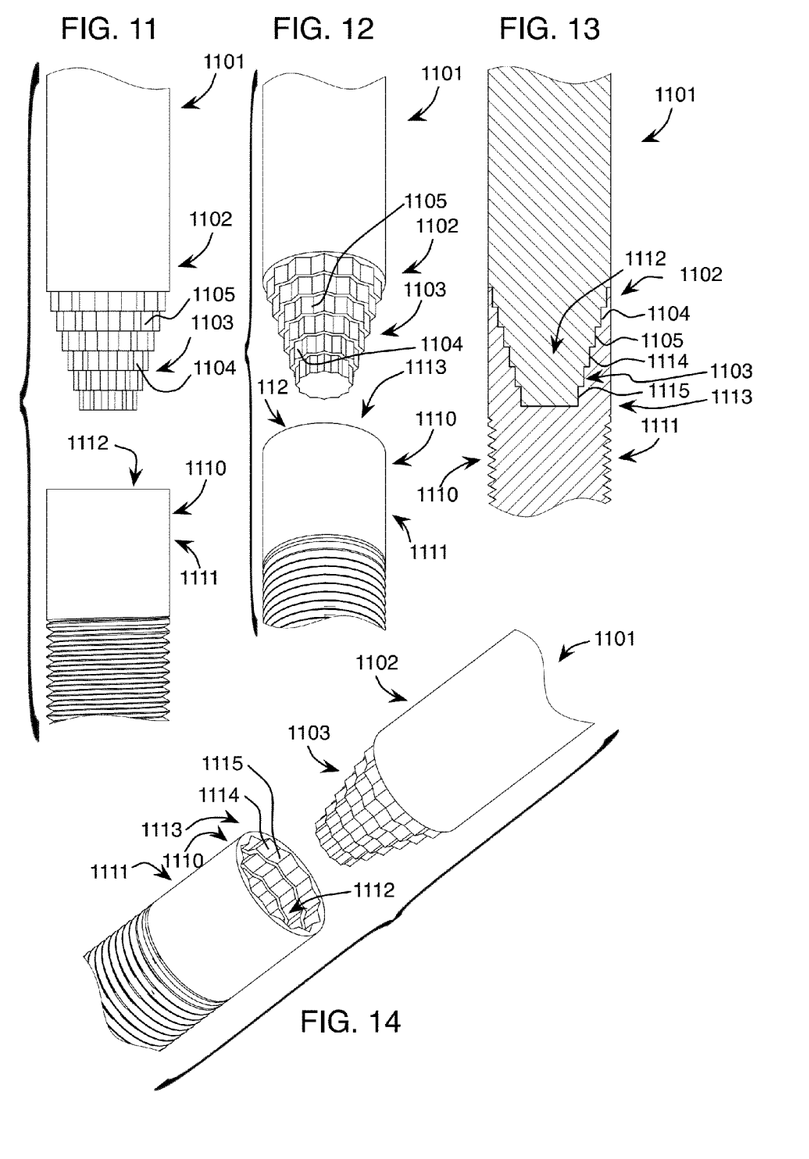
FIG. 11 is a side view of an embodiment of the present invention.
FIG. 12 is a perspective view of an embodiment of the present invention.
FIG. 13 is a cross-sectional view of an embodiment of the present invention.
FIG. 14 is a perspective view of an embodiment of the present invention.

FIG. 10 shows outer sleeve member 200 having internal features at bottom that couple with similar mating external features added to stud 300. These may include splines, knurls, hex, slots, double hex or other geometry. They allow axial translation of stud 300 but couple rotational movement of outer sleeve member 200 and stud 300. Both coupling means 314 formed of polygonal formation 330 and the necessity to couple this hex with the reaction member of the torque input device are no longer necessary. Internal spline 1040 and mating external spline 1041 form a spline interface between outer sleeve member 200 and stud 300, respectively.

In standard bolting industry terms, apparatus 1 includes a nut (inner sleeve member 100) and a washer (outer sleeve member 200). The standard bolting flat surface nut and washer interface is changed. The torque reaction point is moved upwards, as compared to conventional three-piece fasteners. Apparatus of the present invention utilize the concept of conventional three-piece fasteners, which allows for surface conditioning of the outer sleeve to prevent galling, leveraged with a conventional nut and washer arrangement, which retains radial strain such that the inner sleeve may be surface conditioned with minimal risk of fracture.

Advantageously, the invention allows for an increased load bearing surface area between the inner sleeve member, which is clamped, and the outer sleeve members without increasing the overall diameter of the apparatus; a three dimensional load bearing surface area rather than a conventional two dimensional plane; more efficiently and evenly distributed load stress distribution over the load bearing surface area; higher torsion strength; and apparatus with lower mass, dimensions and volume.

Referring to FIGS. 11-14 by way of example, this shows an apparatus 1101 for torsionally coupling a threaded fastener 1110 and a torque input device 1102 in accordance with an embodiment of the present invention. Apparatus 1101 has a first coupling member 1103 with a tapered external surface 1104 and a polygonal formation 1105; and a second coupling member 1113 having an inversely tapered internal surface 1114 and a polygonal formation 1115 non-rotatably engagable with tapered external surface 1104 of first coupling member 1103.

In other words, apparatus 1101 torsionally couples torque input device 1102 and threaded fastener 1110 of the kind having a shank 1111 with a tapered axial bore 1112 at one end. Apparatus 1101 includes coupling member 1103 having inversely tapered external surface 1104 non-rotatably engagable with tapered axial bore 1112.

Discussion related to quantity, dimensions, geometries and intervals of removed external (inner sleeve member 100) and internal (outer sleeve member 200) cylindrical features of FIGS. 1-10 generally applies to the quantity, dimensions, geometries and intervals of removed external (first coupling member 1103) and internal (second sleeve member 1113) polygonal features of FIGS. 11-14. Note that the interface between inner and outer sleeve members 100 and 200 is cylindrical and smooth thus allowing relative rotation. Note, however, that the interface between first and second coupling members is polygonal and angled thus no relative rotation is possible.

A conical geometry for torsional coupling of a threaded fastener and a torque output device yields a better load stress distribution. The embodiment of FIGS. 11-14 introduces a low profile coupling geometry that will allow a torsion-coupling feature on the top of a stud to be formed internally. This distributes stresses more evenly and therefore allows for a more efficient packaging of the coupling features.

Generally, a stepped 12-point hole in the top surface of the stud is used for torsion coupling with a three-piece mechanical stud-tensioning device and/or an apparatus for use with the stud. An internal 12-point feature is placed in the top of the stud at a shallow depth. Successive 12-point features are progressively added at smaller 12-point sizes each at shallow depths and each starting where the preceding 12-point stopped. The pattern of decreasing 12-point geometry will decrease until space restricts the addition of another 12 point. Advantageously, a shaft of the torque input device with external matching features for each of the steps will allow for evenly distributed stress distribution and high torsion strength while decreasing the mass and volume of the studs.

Figures 15, 16, 17:
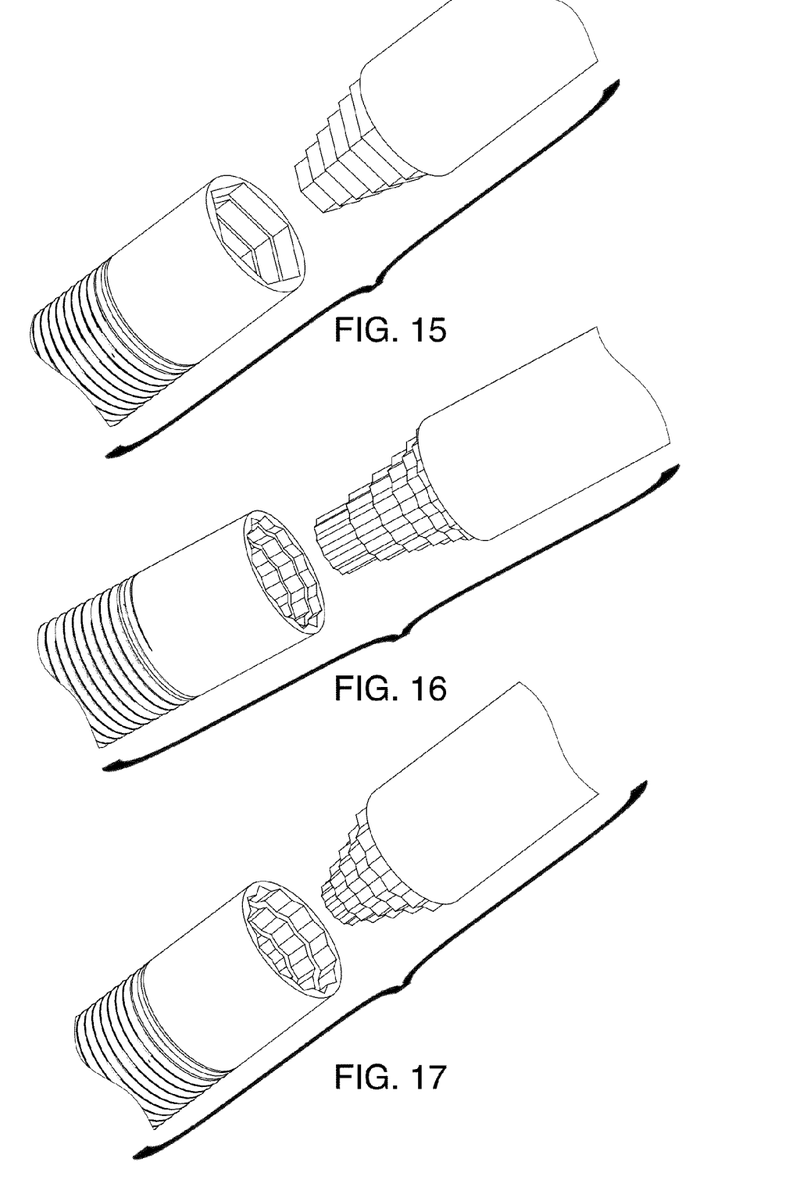
FIG. 15 is a perspective view of an embodiment of the present invention.
FIG. 16 is a perspective view of an embodiment of the present invention.
FIG. 17 is a perspective view of an embodiment of the present invention.
Figure 18:
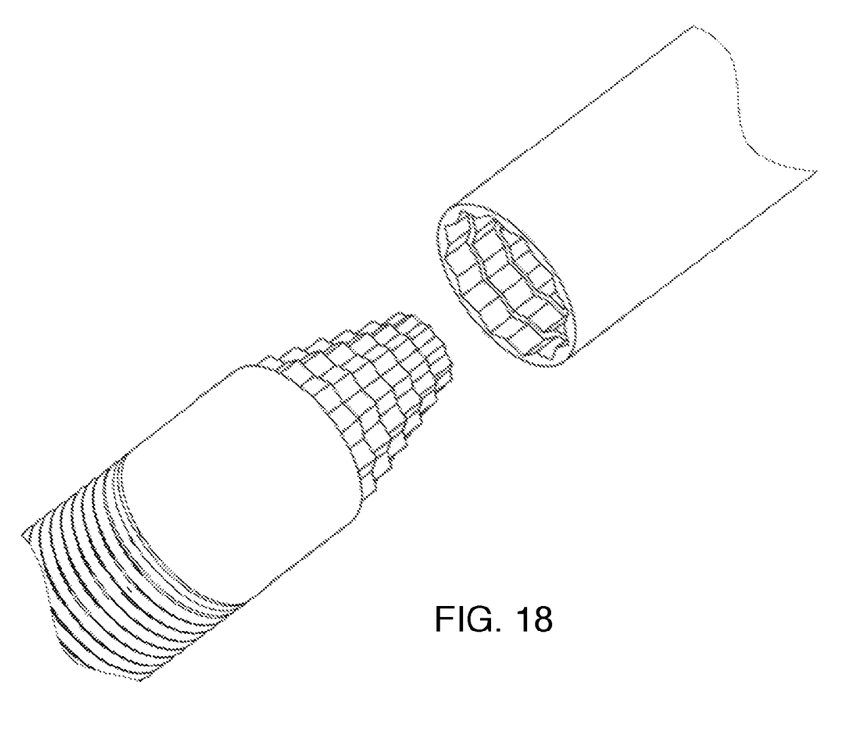
FIG. 18 is a perspective view of an embodiment of the present invention.

As shown in FIGS. 16 and 17, varying the depth and size change from one 12-point feature to the next will increase or decrease the nominal angle of the conical shape these features form. The 12-point feature can be substituted with any geometry that will prevent rotation between the two parts, such as the hex in FIG. 15. Additionally, the step depth can be sized infinitely small to create a smooth taper. Mixed step sizes and geometries can be used to optimize production of such a coupling.

Note that any type of suitable components, sizes and materials of apparatus of the present invention may be used, including: fastener categories, for example wood screws, machine screws, thread cutting machine screws, sheet metal screws, self drilling SMS, hex bolts, carriage bolts, lag bolts, socket screws, set screws, j-bolts, shoulder bolts, sex screws, mating screws, hanger bolts, etc.; head styles, for example flat, oval, pan, truss, round, hex, hex washer, slotted hex washer, socket cap, button, etc.; drive types, for example phillips and frearson, slotted, combination, socket, hex, alien, square, torx, multiple other geometries, etc.; nut types, for example hex, jam, cap, acorn, flange, square, torque lock, slotted, castle, etc.; washer types, for example flat, fender, finishing, square, dock, etc.; and thread types, for example sharp V, American national, unified, metric, square, ACME, whitworth standard, knuckle, buttress, single, double, triple, double square, triple ACME, etc.

It will be understood that each of the elements described above, or two or more together, may also find a useful application in other types of constructions differing from the types described above. The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilized for realizing the invention in diverse forms thereof.

While the invention has been illustrated and described as embodied in a fluid operated tool, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

When used in this specification and claims, the terms "tapered", "taperedly" and variations thereof mean that the specified features, steps, quantities, dimensions, geometries and intervals may, from one end to another, either gradually, suddenly, step-wisely, and/or conically: be inconsistent, vary, narrow, diminish, decrease, get smaller, thin out, etc.

When used in this specification and claims, the terms "comprising", "including", "having" and variations thereof mean that the specified features, steps or integers are included. The terms are not to be interpreted to exclude the presence of other features, steps or components.

What is claimed is:

1. An apparatus for use with a threaded fastener and a torque device including:
   a rigid inner sleeve member having:
      an internal surface threadedly engagable with the fastener;
      an external surface defined by more than two steps that forms a taper;
      an upper surface with a coupling means non-rotatably engagable with an action portion of the torque device;
   an outer sleeve member having an inversely tapered internal surface rotatably engagable with the tapered external surface of the inner sleeve member; and
   wherein the inner sleeve member, when rotated by the action portion of the torque device, applies a load to the threaded fastener.

2. An apparatus according to claim 1 wherein the outer sleeve member is adapted to replace a washer and an outer sleeve associated with conventional three-piece fasteners.

3. An apparatus according to claim 1 wherein the external surface of the inner sleeve member and the internal surface of the outer sleeve member are substantially smooth.

4. An apparatus according to claim 1 wherein the external surface of the inner sleeve member and the internal surface of the outer sleeve member are shaped either as cylinders, frustums of a smooth cone or frustums of a curved solid.

5. An apparatus according to claim 4 wherein the external surface of the inner sleeve member and the internal surface of the outer sleeve member are shaped as solids not limited to particular step quantities, dimensions, geometries, angles and/or intervals.

6. An apparatus according to claim 1 wherein the outer sleeve member substantially surrounds the inner sleeve member.

7. An apparatus according to claim 1 wherein the inner sleeve member is non-rotatably engagable with an action portion of the torque device and the outer sleeve member is non-rotatably engagable with a reaction portion of the torque device.

8. An apparatus according to claim 1 wherein the inner sleeve member is non-rotatably engagable with an action portion of the torque device, and wherein the outer sleeve member and/or a shank of the threaded fastener are non-rotatably engagable with a reaction portion of the torque device.

9. An apparatus according to claim 1 wherein, during operation, the inner sleeve member is adapted to receive an action torque of the torque device, and wherein the outer sleeve member is adapted to receive a reaction torque of the torque device.

10. A threaded fastener having a shank and an apparatus according to claim 1.

11. A torque power tool either pneumatically, electrically, hydraulically or manually driven having an action portion and a reaction portion to tighten or loosen a threaded fastener according to claim 10.

12. A system for fastening objects including:
    a threaded fastener having a shank and an apparatus according to claim 1; and
    a torque power tool either pneumatically, electrically, hydraulically or manually driven having an action portion and a reaction portion to tighten or loosen the threaded fastener.

13. An apparatus according to claim 1 wherein the upper surface coupling means is formed of a plurality of bores extending in an axial direction and spaced from one another in a circumferential direction.

14. An apparatus according to claim 1 wherein the upper surface coupling means is formed of any suitable geometry for rotational coupling with the torque device.

15. An apparatus according to claim 14 wherein the upper surface coupling means is formed of either gear teeth, hexagonal, double hexagonal or castellated projections extending in an axial direction and spaced from one another in a circumferential direction.

* * * * *